(12) United States Patent
Hofmann et al.

(10) Patent No.: US 7,640,733 B2
(45) Date of Patent: Jan. 5, 2010

(54) STRUCTURAL COMPONENT, ESPECIALLY A SHIELDING COMPONENT

(75) Inventors: Dieter Hofmann, Willhermsdorf (DE); Markus Lang, Neumarkt (DE)

(73) Assignee: ElringKlinger AG, Dettingen/Erms (DE)

(*) Notice: Subject to any disclaimer, the term of this patent is extended or adjusted under 35 U.S.C. 154(b) by 898 days.

(21) Appl. No.: 11/131,327

(22) Filed: May 18, 2005

(65) Prior Publication Data
US 2005/0284437 A1 Dec. 29, 2005

(30) Foreign Application Priority Data
Jun. 24, 2004 (DE) .................. 10 2004 030 621

(51) Int. Cl.
*F01N 7/10* (2006.01)
(52) U.S. Cl. .................. 60/323; 60/313; 60/324
(58) Field of Classification Search .................. 60/313, 60/323, 324
See application file for complete search history.

(56) References Cited

U.S. PATENT DOCUMENTS

| | | |
|---|---|---|
| 3,948,340 A | 4/1976 | Breitschwerdt |
| 6,018,946 A * | 2/2000 | Matsumoto .................. 60/323 |
| 6,702,062 B2 * | 3/2004 | Kusabiraki et al. .......... 181/240 |

FOREIGN PATENT DOCUMENTS

| | | |
|---|---|---|
| CA | 2 405 334 A1 | 3/2003 |
| DE | 102 47 641 B3 | 1/2004 |

OTHER PUBLICATIONS

Physiker Klaus and David Bridge; Neue Werkstoffe und Entwicklungs-Tools fur den Hitzeschutz, We .Kstoffe, Hitzeschilde, Dec. 2001, pp. 1044-1055.

* cited by examiner

*Primary Examiner*—Thomas E Denion
*Assistant Examiner*—Diem Tran
(74) *Attorney, Agent, or Firm*—Roylance, Abrams, Berdo & Goodman, L.L.P.

(57) ABSTRACT

A structural part, especially a shielding component, has structural parts (10, 12, 14, 16) at least in part differently configured with respect to their surface extent and/or the directional pattern. At least one structural part (10) of a first type is provided with a curvature at least partially increasing in the direction of at least one edge area (20). Structural parts (12) of a second type at least in part follow the curvature (18) of the first structural part. In each curved edge area (20), at least one structural part (14) of a third type is provided, according to the position in which the structural parts (12) of the second type are oriented and extend continuously at least in the area of the change in the curvature toward the edge area (20) along the first structural part (10). The edge area is strengthened by an additional structural part which, in addition to low-vibration behavior, leads to a clear reduction of acoustic propagation of noisy engine components.

10 Claims, 4 Drawing Sheets

STRUCTURAL COMPONENT, ESPECIALLY A SHIELDING COMPONENT

FIELD OF THE INVENTION

The present invention relates to a structural component, especially a shielding component, with structural parts which are at least in part differently configured with respect to their surface extent and/or the directional pattern. At least one structural part of a first type is provided with a curvature at least partially increasing in the direction of at least one edge area, and with structural parts of a second type at least in part following the pertinent curvature.

BACKGROUND OF THE INVENTION

While heat development, for example, of a high-economy, performance-optimized diesel engine can be very low on the cylinder crankshaft housing, this low heat development does not apply to "hot zones" such as in manifolds, turbocharger, catalytic converter, etc. Due to the more and more compact construction of engines, components not thermally "compatible" are increasingly being placed in close proximity to one another. Accordingly, it is necessary to protect thermal engine components against adjacent, heat-sensitive assemblies, such as sensors, fuel lines, pressure cells, body parts, etc. using so-called shielding components, such as heat shields. The situation is also exacerbated by the compact structure in that the high packing density of the assemblies constricts the cooling air flow in the engine compartment. Noise abatement measures can also contribute to this problem. Thus, for example, plastic bottom plates designed to reduce the emission of noise from the engine compartment to the roadway, under certain circumstances can produce effective insulation enclosing heat in the engine compartment. Catalytic converters, due to their phased high surface temperature, are considered to be among the heat sources certainly necessitating the use of protective shield barriers. One typical example involves positioning the catalytic converter close by the manifold. This design principle performs the function of rapid heat-up of the catalytic converter to reduce emissions in the cold start phase, and shifts a major source of heat into the engine compartment where numerous assemblies are crowded in a tight space. One reason for the growing importance of shielding components such as heat shields is the trend toward use of thermoplastics. The light and economical materials with their exceptional moldability are rapidly becoming common in the engine compartment, but require special attention with respect to ambient temperatures at the application site relative to other thermal engine parts ("New materials and development tools for heat protection", in MTZ 12/2001, Vol. 72, pp. 1044 ff).

DE 102 47 641 B3 discloses a generic structural component, especially in the form of a noise-damping shielding component, as a component of a motor vehicle. To improve acoustic insulation in the known structural component, the pertinent shielding component includes a shielding body with a base edge as a structural part of a first type. This structural part can be fixed on the edge side by angular bracket legs within the engine compartment on stationary parts there, and shields thermal engine components relative to heat-sensitive components.

The shielding body as a structural part of the first type is arched in a U-shape in the middle area, and is configured symmetrical in this respect. The middle area is arched in a U-shape, and undergoes transition on the edge side into edge areas of greater curvature. On the two opposing edge areas, the angular brackets are mounted subsequently as fixing means. The shielding body includes two layers of sheet metal, between which an acoustically insulating and/or heat insulating layer extends. To fix the sheet metal cover layers to one another, flanging is used in which the free flange edge of one cover layer superficially encompasses the edge area of the other cover layer. To reduce weight, the shielding body is made of aluminum or some other lightweight metal.

The known solution is used preferably for shielding a clutch between the gearbox flange and the universal shaft against solid-borne noise originating from the transmission and against the continuing influence of temperature radiation of the adjacently extending exhaust pipe. In tests, a reduction of acoustic emission in the known solution by 3 dB was achieved. To achieve the pertinent shielding action, along the middle area of the first structural part in the form of a shielding body, other structural parts of a second type extend in the form of bead-shaped longitudinal and transverse ribs over the convex outer side of the shielding body. Longitudinal ribs extending over the entire length of the shielding body are adjoined by transverse ribs integrally molded on, forming a type of nub structure and, in an alternating sequence, fitting adjacently into the intermediate spaces between the two respective transverse ribs of an adjacent longitudinal rib. The edge areas are bent off more dramatically to the outside with the connecting brackets, and are conversely kept free of the indicated ribs. With respect to the interrupted transverse rib structure of the known solution, it can be expected that in this respect stiffness and strength are reduced. Furthermore, at the transition point to the connecting brackets, stiffening of the shielding body is obtained only by the bent bracket legs which largely define in this respect the connection geometry of the structural component on the stationary engine or chassis components. In this way, the possible applications of the known structural component are limited. The connecting brackets with their bent bracket legs and eye connecting points for the penetration of a fastener (screw) require installation space, and increase the weight for the known solution.

SUMMARY OF THE INVENTION

An object of the present invention is to provide an improved shielding structural component retaining the prior art advantages of very good acoustic and heat insulation, but requiring less installation space, being usable in a more versatile manner, having simultaneously increased stiffness as well as strength and reduced weight, and having production costs which can be comparably specified.

This object is basically achieved by a structural component where a respective curved edge area has at least one structural part of a third type, according to the position of which the structural parts of the second type are oriented and extend continuously at least in the area of the change of the curvature toward the edge area along the first structural part. The edge area is strengthened by an additional structural part which is an integral component of the shielding body and need not, as is shown in the prior art, comprise attachment-bracket parts seated on the edge side. By transferring the structural parts of the second type in the direction of the respective edge area with the third structural part, the structural parts of the indicated type configured preferably as bead-shaped stiffening ribs are guided in the area of the change in the curvature toward the edge area. In this way, they stiffen the edge structure of the shielding body in the form of the first structural part. In this respect, the structural component can be designed as a flat trough, and takes up little installation space and requires little weight. The structural component can be economically attached to other engine components by known fixing clamps. In the present case, however, a weld connection is chosen for the corresponding fixing. Alternatively, screw connections can also be used for this purpose. By means of the different structural parts, the overall structural component can be stiffened such that a type of shielding armor is created with natural vibration behavior which can be termed noncritical, so that the structural component solution of the present invention is efficiently used especially where the major occurrence of vibrations can be expected in operation. In addition to the indicated advantages, the base structure stiffened in this way effects a clear reduction of acoustic propagation of noisy engine components.

In one preferred embodiment of the structural component of the present invention, the surface extent of the structural part of the first type is greater than that of a structural part of the second type, and the surface extent of a structural part of the third type is different from the surface extent of the structural part of the second type, especially is greater. Preferably, at least one structural part of the fourth type establishes a connection between the structural parts of the second type, and the structural parts of the second type are positioned at least outside of the connecting points to extend continuously along the structural part of the first type. By preference, the structural part of the fourth type forming the connecting points, with respect to its surface extent, is chosen to be smaller than or equal to the surface extent of the structural part of the second type. In all orientations of the shielding component, armor-like strengthening and stiffening are implemented by the resulting structure of preferably bead-shaped longitudinal and transverse ribs over structural part of the first type. This effect can be further enhanced by providing for the structural parts of the second type to discharge into the structural parts of the third and fourth type. In this way, a structural part of one type then supports stiffening by the structural parts of the other types in "flowing transitions".

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings, not drawn to scale and in the form of diagrams, which form a part of this disclosure.

DETAILED DESCRIPTION OF THE INVENTION

Figure 1:
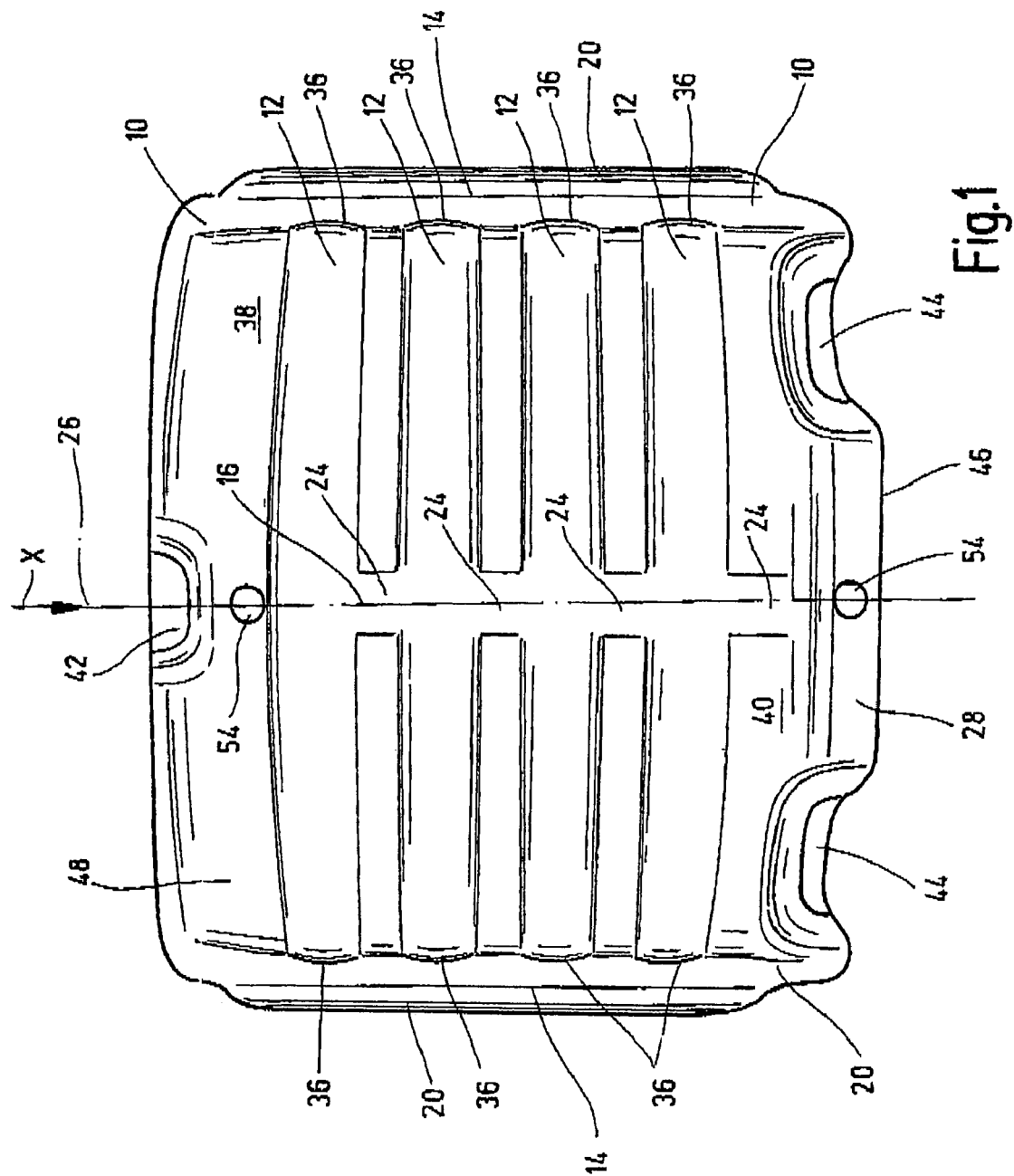
FIG. 1 is a plan view of a structural component according to an exemplary embodiment of the present invention.

The present invention relates to a structural component, especially a shielding component, for use in motor vehicles with structural parts of different types 10, 12, 14, 16 which are at least in part differently configured with respect to their surface extent and/or the directional pattern. At least one first structural part or structural part 10 of a first type is provided with a curvature 18 at least partially increasing in the direction of at least one edge area 20. Second structural parts or structural parts 12 of a second type at least in part follow the pertinent curvature 18. In the respective curved edge area 20, one third structural part or structural part 14 of a third type extends. According to their positions, the structural parts 12 of the second type are oriented and extend continuously at least in the area of the change 22 in the curvature toward the edge area 20 along the first structural part 10.

Figure 2:
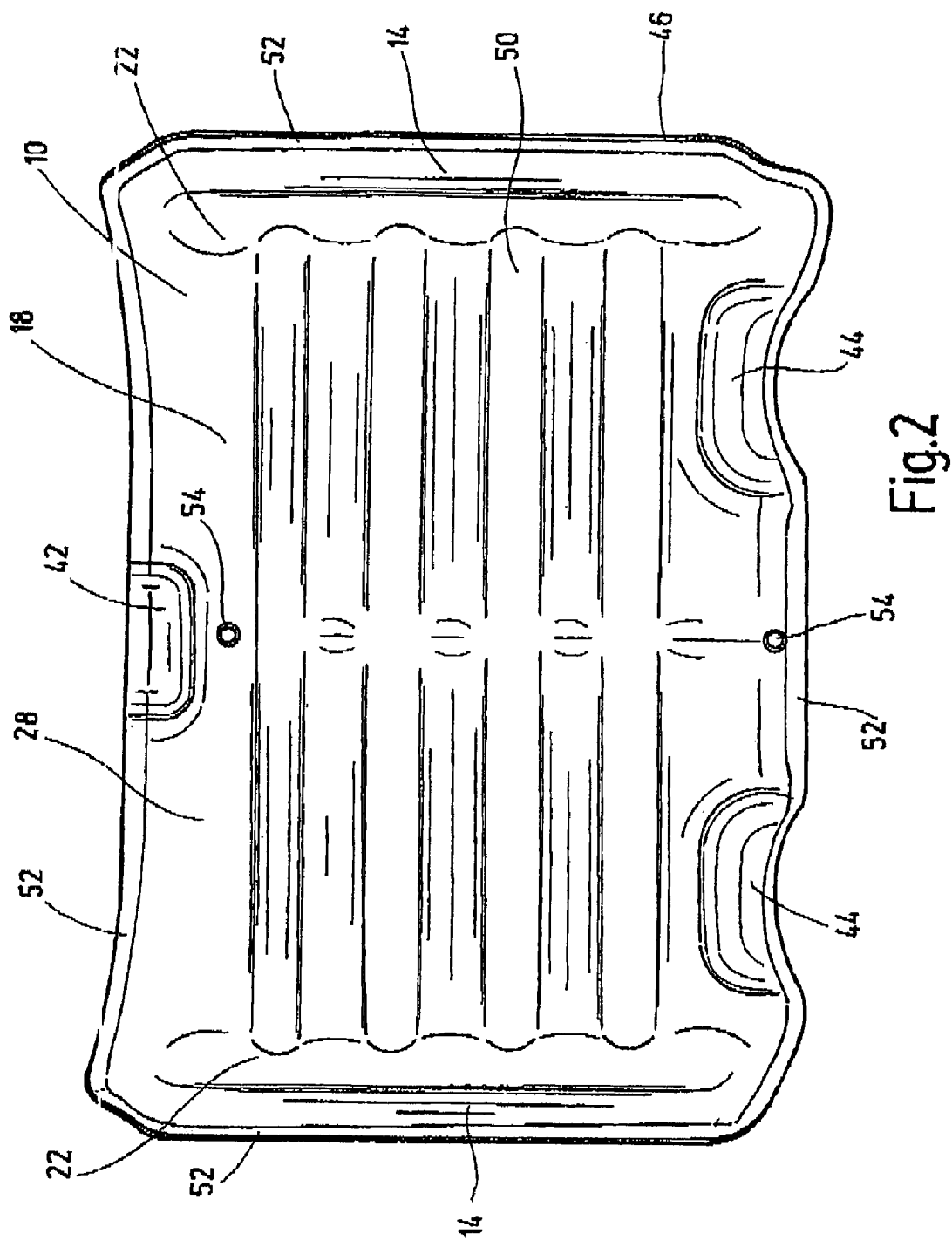
FIG. 2 is a bottom plan view of the structural component of FIG. 1.

As shown especially in the top plan view of FIG. 1 and from the bottom plan view of FIG. 2, the surface extent of the structural part 10 of the first type viewed in the respective plan view is larger than that of the respective structural part 12 of the second type. The surface extent of the structural part 14 of the third type is chosen to be different from the surface extent of the structural part 12 of the second type, especially to be larger. Furthermore, at least one structural part 16 of the fourth type establishes a connection between the structural parts 12 of the second type. The structural parts 12 of the second type are positioned outside the connecting points 24 to extend continuously along the structural part 10 of the first type (see FIG. 1). The fourth structural part or structural part 16 of the fourth type, with respect to its surface extent, is chosen to be smaller than the surface extent of a structural part 12 of the second type.

Figure 4:
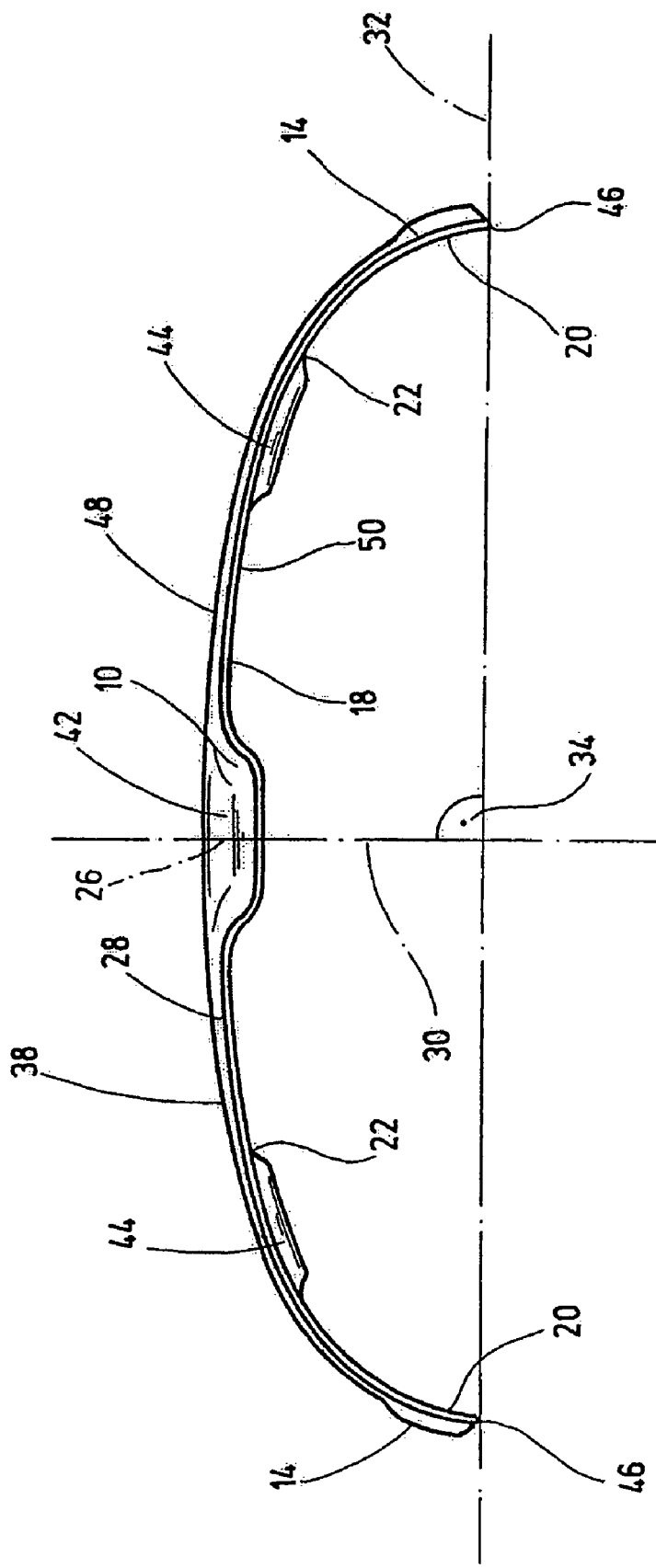
FIG. 4 is a front elevational view of the structural component in the direction X of FIG. 1.

As shown especially from the cross sectional shape illustrated in FIG. 4, the structural part 10 of the first type has essentially a symmetrical structure in the longitudinal and transverse directions, with the two edge areas 20 of greater curvature which are opposite one another in the transverse direction and with a middle area 28 of lesser curvature extending between the two edge areas. The actual symmetrical structure becomes a plane 30 passing through the middle longitudinal axis 26 and including a right angle 34 with an imaginary chord 32 of an arc formed by the cross section of the structural part 10 of the first type.

Figure 3:
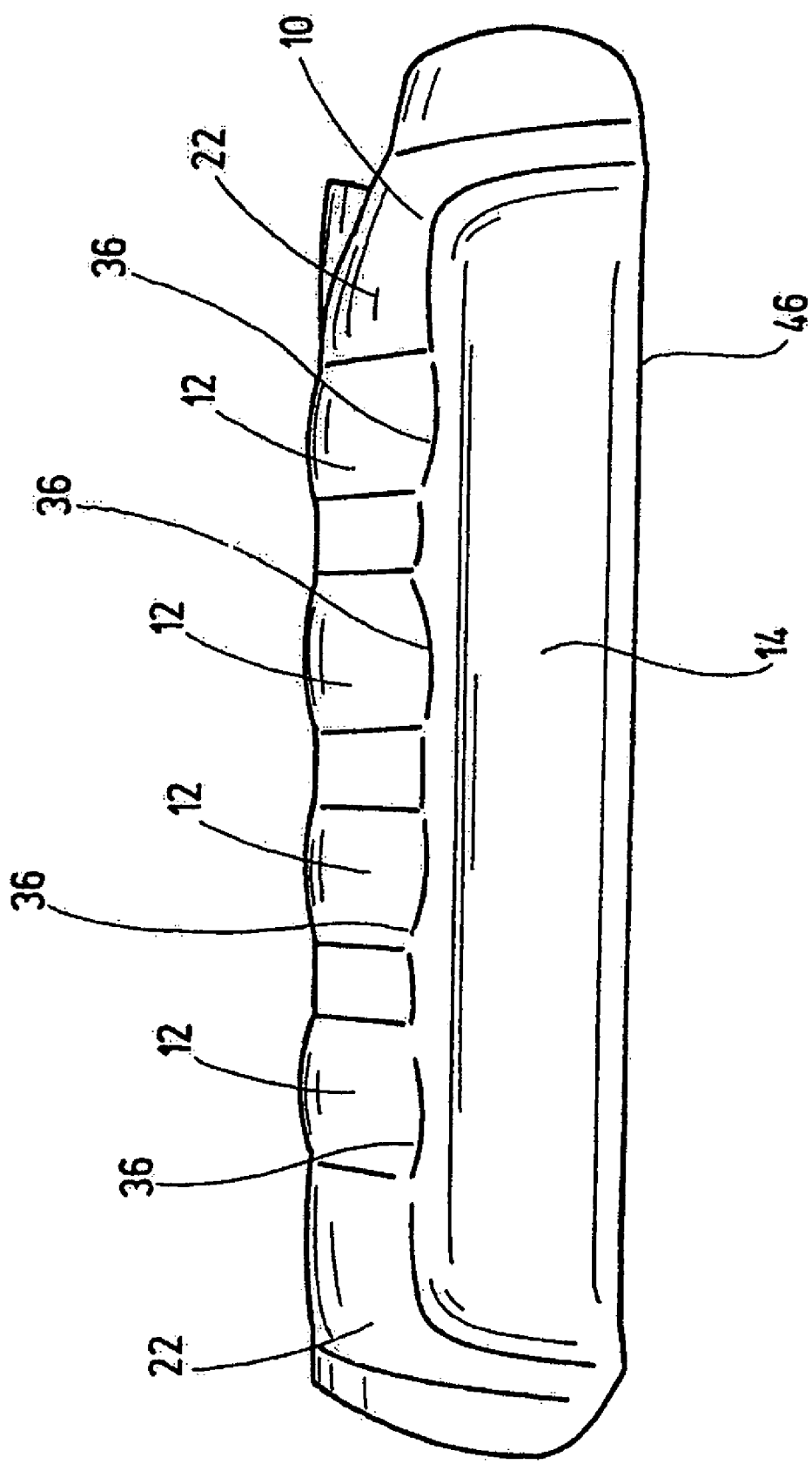
FIG. 3 is a side elevational view of the structural component of FIG. 1.

As seen from FIGS. 1 and 2, the structural parts 12 of the second type which are respectively directly adjacent have the same distance to one another, which distance is smaller than the distance of the structural part 16 of the fourth type to one structural part 14 of the third type 14. The structural parts 12 of the second type are positioned to extend parallel to one another in the transverse direction of the structural part 10 of the first type. Their respectively free ends 36 are opposite one another, and join the structural parts 14 of the third type. The joining is seen especially from the side representation in FIG. 3. At the site of the junction, the respective ends 36 are shaped convexly. At the site of the transition, the structural part 14 of the third type is provided with the corresponding concave depressions.

In the direction of FIG. 1, to the top and bottom in the longitudinal direction of the structural part 10 of the first type, the structural part 12 positioned respectively uppermost and lowermost passes into plane transition surfaces 38, 40. Along the middle longitudinal axis 26, in the top area of the structural part 10, a middle impression 42 is provided. In the lower area on the transition surface 40, off-center, two protrusions 44 are provided. This impression 42 and these protrusions 44 can be used for engagement of mounting clamps (not detailed), which are conventional in the area of heat shields and which are provided for attachment of the structural component to other engine components and/or chassis parts. By the impression 42 and protrusions 44, fixing by a weld or screw connection can also be obtained in this manner. The structural part 16 of the fourth type shown in FIGS. 1 and 2 is positioned only once along the middle longitudinal axis 26 in the structural part 10 of the first type. The possibility also exists, for purposes of an especially stiffened configuration, to place structural parts 16 of the fourth type here repeatedly and also off-center. Furthermore, the structural part 16 of the fourth type viewed in the direction of FIG. 1 begins on the structural part 12 of the second type positioned uppermost and is continued on its lower end in the direction of the transition surface 40, projecting on and overlapping the surface 40.

As seen from the figures, the structural parts of the third and fourth types 14, 16 in the longitudinal direction of the structural part 10 of the first type are positioned extending in straight lines. The structural parts 14 of the third type extend in the longitudinal direction to the outside partially bordering the free edge 46 of the structural part 10 of the first type. Within the scope of the present invention, the structural parts 12 of the second type need not join the structural parts of the third and fourth types 14 and 16. Such structural parts can assume discrete distances from one another. However, it is crucial that the structural parts 12 of the second type extend along the change 22 in curvature in the structural part 10 of the first type to ensure increased stiffness and strength in the delineated edge areas 20.

Each structural part 10, 12, 14, 16 is multi-layered in structure, formed especially of two sheet metal cover layers 48 (FIG. 1) and 50 (FIG. 2). Between the two sheet metal cover layers 48, 50, an acoustic and/or heat insulating intermediate layer (not detailed) extends. The configuration of these intermediate layers is disclosed in the prior art, for example, as in DE 41 37 706 C2, DE 102 53 508 B3, DE 42 11 409 A1, etc. To ensure increased corrosion protection, the cover layers 48, 50 are preferably formed from a high-quality steel material. Furthermore, the structural component is configured as a formed part, with the structural parts 12, 14, 16 connected integrally to one another, beginning with the second type 12, forming bead-shaped longitudinal and transverse ribs as integral components of the structural part 10 of the first type. The longitudinal and transverse ribs of different types positioned perpendicular on one another in this way allow an armor-like structure of the structural part 10 of the first type, and accordingly a shielding body which is especially vibration-resistant.

Within the scope of the inventive configuration, a separation can be effected along the middle longitudinal axis 26 such that instead of the illustrated full shell only a segment-like part-half shell forms the structural part. Then, only one edge area 20 with the corresponding change 22 in the curvature is present. Furthermore, the possibility also exists of the structural part 10 of the first type to extend without further curvature, and accordingly, to be configured as plane as a flat shape. The two sheet metal cover layers 48, 50 are securely connected to one another in the conventional manner (not detailed) by flanging 52 while retaining the intermediate layer (not detailed). This flanging 52 encompasses the structural component on the circumferential side along its lower free edge 46. Furthermore, it is still within the scope of the present invention, instead of the bead-like impressions for the longitudinal and transverse ribs, to position the structural parts 12, 14, 16 under consideration on the structural part 10 of the first type, for example, by a welding process or the like, and not, as described, to deep-draw or shape, emboss or crimp the pertinent structural parts.

With the present invention, for certain applications an optimum of low weight, low production costs, low vibration, high stiffness and strength with simultaneously very good heat and acoustic insulation is achieved. Moreover the structural component has an elegant appearance. The connection of the sheet metal layers to one another can be supported at the same time by riveted joints 54. For certain applications, it is also sufficient to configure the structural component with only one layer or two layers.

The structural components of the other types, beginning with the second type 12, overall have a projecting prominent area larger than the nonprominent projecting area of the structural component of the first type 10. Furthermore, the structural parts 14 of the third type extend along the respective edge area 20 of the structural part 10 of the first type, and toward their two free end sides they have an axial projection relative to the inlet area of the structural parts 12 of the second type. Furthermore, for the structural parts 12 of the second type, an alternating pattern is conceivable in which, proceeding from the middle longitudinal axis 26 of the structural part 10, one structural part 12 always extends in alternation in one transverse direction or the other which is facing away from the structural part 16 of the fourth type. Furthermore, as shown in FIG. 1 the structural parts 12, 14, and 16 sit on the convex top of the structural part 10, and in this way form the described topographical projection. Furthermore, instead of an external topographic projection, the structural parts 12, 14 and 16 be positioned on the inside of the structural part 10 or both inside and outside.

While one embodiment has been chosen to illustrate the invention, it will be understood by those skilled in the art that various changes and modifications can be made therein without departing from the scope of the invention as defined in the appended claims.

What is claimed is:

1. A shielding component, comprising:
   first, second, third and fourth structural parts having different configurations in at least one of surface extent and pattern;
   said first structural part being symmetrical in longitudinal and transverse directions, having a curvature at least partially increasing in a direction of two transversely opposite curved edge areas thereof, having a middle area of lesser curvature extending between said edge areas, and having a plane of symmetry forming a right angle with an imaginary chord of an arc formed by a cross section of said first structural part;
   said second structural parts at least partially following said curvature of said first structural part and positioned at least outside of connecting points to extend continuously along said first structural part;
   said third structural parts extending continuously in said curved edge areas in areas of change in said curvature toward said edge areas along said first structural part according to positioning of said second structural parts; and
   at least one said fourth structural part connecting between said second structural parts, having a surface extent smaller than or equal to a surface extent of one of said second structural parts, and extending along a central longitudinal axis of said first structural part.

2. A shielding component according to claim 1 wherein said first structural part has a surface extent greater than said surface extent of one of said second structural parts; and
said third structural part has a surface extent greater than said surface extent of one of said second structural parts.

3. A shielding component according to claim 1 wherein said second structural parts extend parallel to one another in the transverse direction of said first structural part, and have free ends joined to said third structural parts.

4. A shielding component according to claim 1 wherein said third and fourth structural parts extend in straight lines in the longitudinal direction of said first structural part; and
said third structural parts border free edges of said first structural part.

5. A shielding component according to claim 1 wherein said structural parts are integrally formed and connected, and comprise longitudinal and transverse ribs forming integral components of said first structural part.

6. A shielding component according to claim 1 wherein said second structural parts directly adjacent one another are spaced by equal distances different than a distance of one of said third structural parts to said fourth structural part.

7. A shielding component according to claim 6 wherein each said equal distance is smaller than said distance of said one of said third structural parts to said fourth structural part.

8. A shielding component according to claim 1 wherein each of said structural parts has cover layers of sheet metal and an insulating layer between said cover layers.

9. A shielding component according to claim 8 wherein said cover layers are of steel.

10. A shielding component according to claim 8 wherein said insulating layer is at least one of acoustic insulation and heat insulation.

* * * * *